A. KNEIP.
Velocipede.

No. 222,506. Patented Dec. 9, 1879.

Witnesses
Otto Hufeland
William Miller

Inventor
Anton Kneip.
by
Van Santvoord & Hauff
his attorneys.

UNITED STATES PATENT OFFICE.

ANTON KNEIP, OF BROOKLYN, NEW YORK.

IMPROVEMENT IN VELOCIPEDES.

Specification forming part of Letters Patent No. 222,506, dated December 9, 1879; application filed June 5, 1879.

*To all whom it may concern:*

Be it known that I, ANTON KNEIP, of the city of Brooklyn, county of Kings, and State of New York, have invented a new and useful Improvement in Velocipedes, which invention is fully described in the following specification, reference being had to the accompanying drawings, in which—

Figure 1:
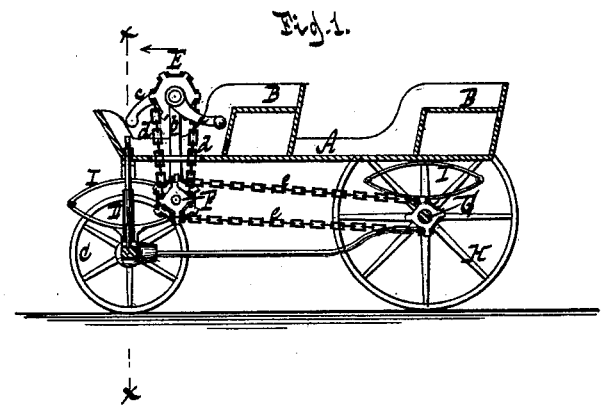
Figure 2:
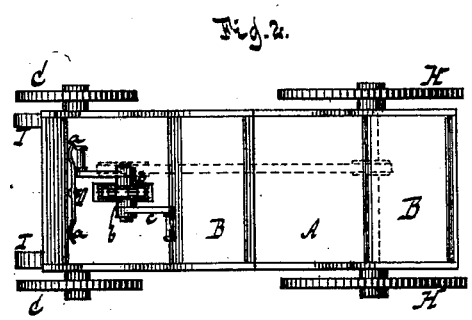
Figure 3:
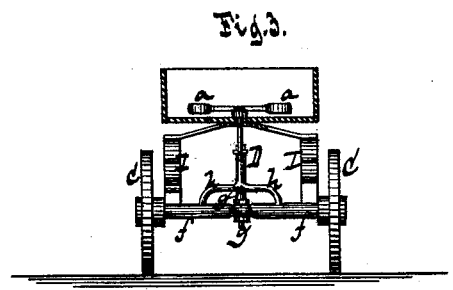

Figure 1 represents a longitudinal vertical section. Fig. 2 is a plan or top view. Fig. 3 is a section in the plane $x$ $x$, Fig. 1, looking in the direction of the arrow.

Similar letters indicate corresponding parts.

My invention relates to velocipedes in which the driving power is derived from rear driving-wheels, and the steering is effected by the fore wheels mounted on a swiveling axle.

It consists in the combination, in a velocipede, of a tiller provided at its lower end with laterally-branching arms, an axle lying directly under the said arms, and to which the ends of said arms are rigidly attached, and a king-bolt rising up through the axle to a bearing at the junction of the arms of the tiller, whereby the king-bolt is steadied and prevented from breaking or bending, and an easy swiveling movement of the axle in steering is attained.

In the drawings, the letter A designates the body of the velocipede, which rests on springs I. On this body are seats B B. The front seat is for the driver.

The front wheels, C, turn on a bolt, D, on the top of which is firmly fastened a foot-lever, $a$ $a$, on which the driver places his feet, so as to steer the vehicle.

To the body A are fastened standards $b$ $b$, which pass through said body. In these standards turn the pulleys E and F. The pulley E is turned by cranks $c$ $c$, which are manipulated by the driver. A cord or chain, $d$, imparts motion to the second pulley, F, and from this pulley the motion is transferred by a cord or chain, $e$, to a pulley, G, keyed to the axle of the driving-wheels H. By this means the driving-wheels are caused to revolve and the velocipede is driven forward.

The advantage of having the pulley F directly under the pulley E is that said pulley F is nearer the driving-wheels H; hence the cord or chain $e$ preserves an almost uniform tension, even when the springs I are compressed, as when many persons are in the vehicle.

The axle $f$ of the front wheels, C, turns about a king-bolt, $g$.

The tiller D is provided with arms $h$ $h$, which are attached to the axle $f$, by which means the vehicle is steered.

The king-bolt $g$ rises up through the axle into the juncture of the arms $h$ $h$, whereby said king-bolt is steadied and is prevented from breaking.

What I claim as new, and desire to secure by Letters Patent, is—

1. The combination, in a velocipede, of a tiller provided at its lower end with laterally-branching arms, an axle longitudinally under said arms, to which the ends of said arms are rigidly attached, and a king-bolt about which said axle turns, said king-bolt rising up through the axle to a bearing at the junction of the arms of the tiller, substantially as described, whereby the king-bolt is steadied and prevented from breaking or bending, and an easy swiveling movement of the axle in steering is attained.

2. The combination of the tiller D, provided with arms $h$ $h$, axle $f$, to which said arms are attached, a king-bolt, $g$, passing up through the said axle to a bearing at the junction of the arms, and the cross-arm at the head of the tiller provided with foot-pieces or pedals $a$ $a$, substantially as described.

In testimony whereof I have hereunto set my hand and seal this 3d day of June, A. D. 1879.

ANTON KNEIP. [L. S.]

Witnesses:
W. HAUFF,
J. HERMANN WAHLERS.